US009510567B2

United States Patent
Donker et al.

(10) Patent No.: US 9,510,567 B2
(45) Date of Patent: Dec. 6, 2016

(54) LAYING NEST WITH EXPULSION SYSTEM

(71) Applicant: Uniq AG, Zürich (CH)

(72) Inventors: Johannes Albert Donker, Zürich (CH); Frank Luttels, Zürich (CH)

(73) Assignee: Uniq AG, Zurich (CH)

( * ) Notice: Subject to any disclaimer, the term of this patent is extended or adjusted under 35 U.S.C. 154(b) by 0 days.

(21) Appl. No.: 14/441,416

(22) PCT Filed: Nov. 8, 2013

(86) PCT No.: PCT/IB2013/060001
§ 371 (c)(1),
(2) Date: May 7, 2015

(87) PCT Pub. No.: WO2014/072945
PCT Pub. Date: May 15, 2014

(65) Prior Publication Data
US 2015/0351370 A1  Dec. 10, 2015

(30) Foreign Application Priority Data

Nov. 9, 2012  (NL) ...................................... 2009780

(51) Int. Cl.
*A01K 31/14*  (2006.01)
*A01K 31/16*  (2006.01)
*A01K 31/00*  (2006.01)

(52) U.S. Cl.
CPC ............ *A01K 31/16* (2013.01); *A01K 31/007* (2013.01)

(58) Field of Classification Search
CPC ............................. A01K 31/16; A01K 31/007
USPC ................ 119/329–337, 339–344, 347, 437, 439,119/487, 701, 703, 704
See application file for complete search history.

(56) References Cited

U.S. PATENT DOCUMENTS

| 663,916 | A | * | 12/1900 | Markwell | ............... | A01K 31/18 |
| | | | | | | 119/487 |
| 902,056 | A | * | 10/1908 | Crosley | .................. | A01K 31/16 |
| | | | | | | 119/339 |
| 1,217,721 | A | * | 2/1917 | Drake | .................... | A01K 31/16 |
| | | | | | | 119/333 |

(Continued)

FOREIGN PATENT DOCUMENTS

NL  9301627  4/1995
WO  WO-2014/072945  5/2014

OTHER PUBLICATIONS

"International Application No. PCT/IB2013/060001, International Search Report Mailed Jan. 27, 2014", 4 pgs.

*Primary Examiner* — Joshua J Michener
*Assistant Examiner* — Devin Barnett
(74) *Attorney, Agent, or Firm* — Schwegman Lundberg & Woessner, P.A.

(57) ABSTRACT

A laying nest comprising boxes (12) having at least a bottom (24), sidewalls (18), a back wall (22), and a roof (20). Further, the laying nest comprises an expulsion system which comprises a shaft (26) which is provided with at least one gear wheel which is fixedly connected with the shaft. An expulsion plate of the expulsion system is rotatably connected with the shaft and via a support shaft is pivotably and slidably connected with the box. The expulsion system further comprises a gear rack (34) which is fixedly arranged in the box and which is configured for cooperation with the gear wheel, such that upon rotation of the shaft, this shaft moves along the gear rack, thereby carrying along the expulsion plate.

5 Claims, 9 Drawing Sheets

(56) References Cited

U.S. PATENT DOCUMENTS

| | | | | |
|---|---|---|---|---|
| 1,434,271 A * | 10/1922 | Van Orden | A01K 31/16 | 119/331 |
| 1,443,609 A * | 1/1923 | Onslow | A01K 31/16 | 119/332 |
| 1,467,622 A * | 9/1923 | McMurphy | A01K 31/16 | 119/330 |
| 1,523,256 A * | 1/1925 | Butler | A01K 31/16 | 119/344 |
| 2,195,702 A * | 4/1940 | Kent | A01K 31/165 | 119/331 |
| 2,264,156 A * | 11/1941 | Apple | A23B 5/05 | 119/337 |
| 2,539,052 A * | 1/1951 | Birky | A01K 31/16 | 119/344 |
| 2,620,589 A * | 12/1952 | Jones | A01M 23/18 | 119/330 |
| 2,676,566 A * | 4/1954 | Krieger | A01K 31/007 | 119/336 |
| 2,692,578 A * | 10/1954 | Manning | A01K 31/16 | 119/335 |
| 2,737,926 A * | 3/1956 | Maness | A01K 31/16 | 119/331 |
| 2,833,246 A * | 5/1958 | Weber | A01K 31/16 | 119/335 |
| 3,027,871 A * | 4/1962 | Peterson | A01K 31/16 | 119/329 |
| 3,046,940 A * | 7/1962 | Kurtz | A01K 31/007 | 119/335 |
| 3,111,215 A * | 11/1963 | Willis | A01K 31/165 | 119/337 |
| 3,118,425 A * | 1/1964 | Kurtz | A01K 31/16 | 119/335 |
| 3,157,156 A * | 11/1964 | Peterson | A01K 31/16 | 119/337 |
| 3,164,129 A * | 1/1965 | Rigterink | A01K 31/16 | 119/336 |
| 3,183,889 A * | 5/1965 | Peterson | A01K 31/16 | 119/337 |
| 3,237,601 A * | 3/1966 | Sandberg | A01K 31/165 | 119/337 |
| 3,292,583 A * | 12/1966 | Peterson | A01K 31/16 | 119/329 |
| 3,465,723 A * | 9/1969 | Matunaga | A01K 31/16 | 119/331 |
| 3,650,246 A * | 3/1972 | Fowler | A01K 31/165 | 119/337 |
| 3,941,091 A * | 3/1976 | Fleshman | A01K 31/17 | 119/335 |
| 4,188,911 A * | 2/1980 | Rafaely | A01K 31/16 | 119/329 |
| 4,381,732 A * | 5/1983 | Huisinga | A01K 31/16 | 119/329 |
| 4,425,127 A * | 1/1984 | Suzuki | A61F 5/4401 | 604/366 |
| 4,800,677 A * | 1/1989 | Mack | A01K 1/0107 | 119/161 |
| 4,800,841 A * | 1/1989 | Yananton | A01K 1/0125 | 119/168 |
| 4,852,518 A * | 8/1989 | Yananton | A01K 1/0107 | 119/169 |
| 4,869,204 A * | 9/1989 | Yananton | A01K 1/0107 | 119/165 |
| 4,892,528 A * | 1/1990 | Suzuki | A61F 13/49017 | 604/382 |
| 5,058,530 A * | 10/1991 | Van De Ven | A01K 31/16 | 119/337 |
| 5,217,447 A * | 6/1993 | Gagnon | A61F 13/49003 | 2/400 |
| 5,222,459 A * | 6/1993 | Johnson | A01K 31/16 | 119/330 |
| 5,429,632 A * | 7/1995 | Tanji | A61F 13/49009 | 604/385.28 |
| 5,555,847 A * | 9/1996 | Kelly | A01K 23/00 | 119/850 |
| 5,624,424 A * | 4/1997 | Saisaka | A61F 13/49011 | 604/385.28 |
| 5,715,772 A * | 2/1998 | Kamrath | A01K 1/0157 | 119/169 |
| 5,950,564 A * | 9/1999 | Meron | A01K 31/16 | 119/332 |
| 6,090,730 A * | 7/2000 | Fujiwara | A61F 13/511 | 442/361 |
| 6,234,114 B1 * | 5/2001 | Dyer | A01K 31/16 | 119/334 |
| 6,244,216 B1 * | 6/2001 | Ochi | A01K 1/0107 | 119/169 |
| 6,550,423 B1 * | 4/2003 | Pope | A01K 1/0107 | 119/161 |
| 6,578,520 B2 * | 6/2003 | Otsuji | A01K 1/0157 | 119/165 |
| 6,635,798 B1 * | 10/2003 | Yoshioka | A61F 13/15203 | 604/365 |
| 8,101,815 B2 * | 1/2012 | Kaneko | A01K 1/0107 | 119/169 |
| 2002/0000206 A1 * | 1/2002 | Ikegami | A01K 1/0107 | 119/161 |
| 2003/0094140 A1 * | 5/2003 | Otsuji | A01K 1/0107 | 119/169 |
| 2004/0054331 A1 * | 3/2004 | Hamilton | A61F 13/15 | 604/200 |
| 2004/0144326 A1 * | 7/2004 | Smith | A01K 31/165 | 119/337 |
| 2004/0255869 A1 * | 12/2004 | Matsuo | A01K 1/0107 | 119/170 |
| 2005/0166855 A1 * | 8/2005 | Kaneko | A01K 1/0107 | 119/169 |
| 2005/0166856 A1 * | 8/2005 | Kaneko | A01K 1/0107 | 119/169 |
| 2006/0200105 A1 * | 9/2006 | Takahashi | A01K 1/0107 | 604/360 |
| 2008/0173250 A1 * | 7/2008 | Dowty | A01K 31/16 | 119/347 |
| 2009/0000557 A1 * | 1/2009 | Takahashi | A01K 1/0157 | 119/161 |
| 2009/0000561 A1 * | 1/2009 | Takahashi | A01K 1/0107 | 119/171 |
| 2009/0044756 A1 * | 2/2009 | Otsuji | A01K 1/0152 | 119/169 |
| 2011/0146581 A1 * | 6/2011 | Sasano | A01K 1/0107 | 119/171 |
| 2014/0338607 A1 * | 11/2014 | Takagi | A01K 1/0157 | 119/161 |
| 2015/0027380 A1 * | 1/2015 | Sasano | A01K 1/0157 | 119/161 |
| 2015/0136035 A1 * | 5/2015 | Takahashi | A01K 1/0107 | 119/161 |
| 2015/0150212 A1 * | 6/2015 | Takagi | A01K 1/0107 | 119/161 |
| 2015/0164038 A1 * | 6/2015 | Takagi | A01K 1/0157 | 119/161 |
| 2015/0189852 A1 * | 7/2015 | Takagi | A01K 1/0107 | 119/172 |
| 2015/0201579 A1 * | 7/2015 | Takagi | A01K 1/0107 | 119/171 |

\* cited by examiner

LAYING NEST WITH EXPULSION SYSTEM

PRIORITY APPLICATIONS

This application is a U.S. National Stage Filing under 35 U.S.C. 371 from International Application No. PCT/IB2013/060001, filed on 8 Nov. 2013, and published as WO/2014/072945 on 15 May 2014, which claims the benefit under 35 U.S.C. 119 to Netherlands Application No. 2009780, filed on 9 Nov. 2011; which applications and publication are incorporated herein by reference in their entirety.

FIELD OF THE INVENTION

The invention relates to a laying nest with expulsion system. An expulsion system ensures that the hens are removed from the laying nests in the evening so that they cannot sleep in them at night.

BACKGROUND OF THE INVENTION

Currently, two expulsion systems are known, viz., the torsion system and the gear rack system. Both principles have been on the market for decades.

The gear rack system is a system comprising a drive shaft 1 arranged in a fixed position, which is provided at several positions with gear wheels 2 fixedly connected with the drive shaft. The gear wheels engage gear racks 3 associated with them. The gear racks are connected by one end to the bottom 4 of the box of the laying nest 6. The bottom is pivotably arranged and can be pushed by the gear rack from a substantially horizontal position to a substantially vertical position upon rotation of the drive shaft. As a result, the hens cannot continue sitting in the box anymore. FIGS. 1 and 2 respectively show a perspective view and a side elevational view of an example of a laying nest with gear rack expulsion system.

The torsion system comprises an expulsion plate 7 which is fixedly mounted to a tube 8. The tube is in a fixed position and is rotatable about its axis. As soon as the tube is rotated, the expulsion plate pivots along with it and pushes the hens out of the system. FIG. 3 shows a side elevational view of an example of the torsion system. In that example the expulsion plate is designed in two parts 7a, 7b which are pivotable relative to each other. Through this construction an opening via which the eggs roll from a box to the egg conveyor is not blocked by the expulsion plate 7 when the latter is situated in a position moved against a back wall of the box (see left-hand box in FIG. 3). In the right-hand box of FIG. 3 the expulsion plate is shown in an intermediate position and an end position. NL-8602398 (A) describes an example of such a torsion system.

NL-9301627 describes a system which is a kind of combination of the gear rack system and the torsion system, whereby a drive shaft arranged in a fixed position is provided with gear wheels which are engaged by movably arranged gear racks. The gear racks have one end indirectly connected to a pivotably arranged expulsion plate.

SUMMARY OF THE INVENTION

A problem of the gear rack expulsion system is that it needs to lift the full weight of all hens and the bottoms to drive the hens out of the boxes of the laying nests. This requires a heavy-duty drive, which is unfavorable from the viewpoint of costs. Moreover, the bottoms and the gear racks need to be of relatively heavy design to be able to resist the forces occurring upon upward pivoting of the bottoms and the chickens present thereon.

A problem of the torsion system is that a lower edge of the expulsion plate during the pivoting movement is at such a large distance from the bottom of the box that the possibility of chickens passing under the edge and then remaining behind in the box cannot be precluded. Also, it happens that dead hens are not removed from the box. These same problems also play a role in the system known from NL-9301627.

The invention contemplates the provision of a laying nest with an alternative expulsion system. More particularly, the invention contemplates the provision of a laying nest that resolves the above-described problems at least partly.

To this end, the invention provides a laying nest comprising:
  at least one box having at least a bottom, sidewalls, a back wall, and a roof;
  an expulsion system which comprises
    a shaft which is provided with at least one gear wheel which is fixedly connected with the shaft;
    an expulsion plate which is rotatably connected with the shaft and which via a support shaft is pivotably and slidably connected with the box;
    a gear rack which is fixedly arranged in the box and which is configured for cooperation with the gear wheel, such that upon rotation of the shaft, this shaft moves along the gear rack, thereby carrying along the expulsion plate.

A laying nest having such an expulsion system provides the advantage that a lower edge of the expulsion plate can be moved accurately and closely along the bottom. In fact, the movement of the expulsion plate is not limited to a simple pivotal movement about a fixedly arranged shaft. Owing to the shaft traversing a path along the gear rack and owing to the support shaft being slidably and pivotably connected with the box, the path traversed by the lower edge of the expulsion plate can be accurately determined through a suitable choice of the path along which the gear rack extends.

In a further elaboration, the gear rack extends along a curved path. The curvature of the path can be adapted to the shape of the bottom of the box, such that the lower edge of the expulsion plate is close to the bottom in any pivoted position.

Further elaborations of the invention are described in the subclaims. The invention and the further elaborations will be further clarified on the basis of an exemplary embodiment, with reference to the drawings.

DETAILED DESCRIPTION

Figure 1:
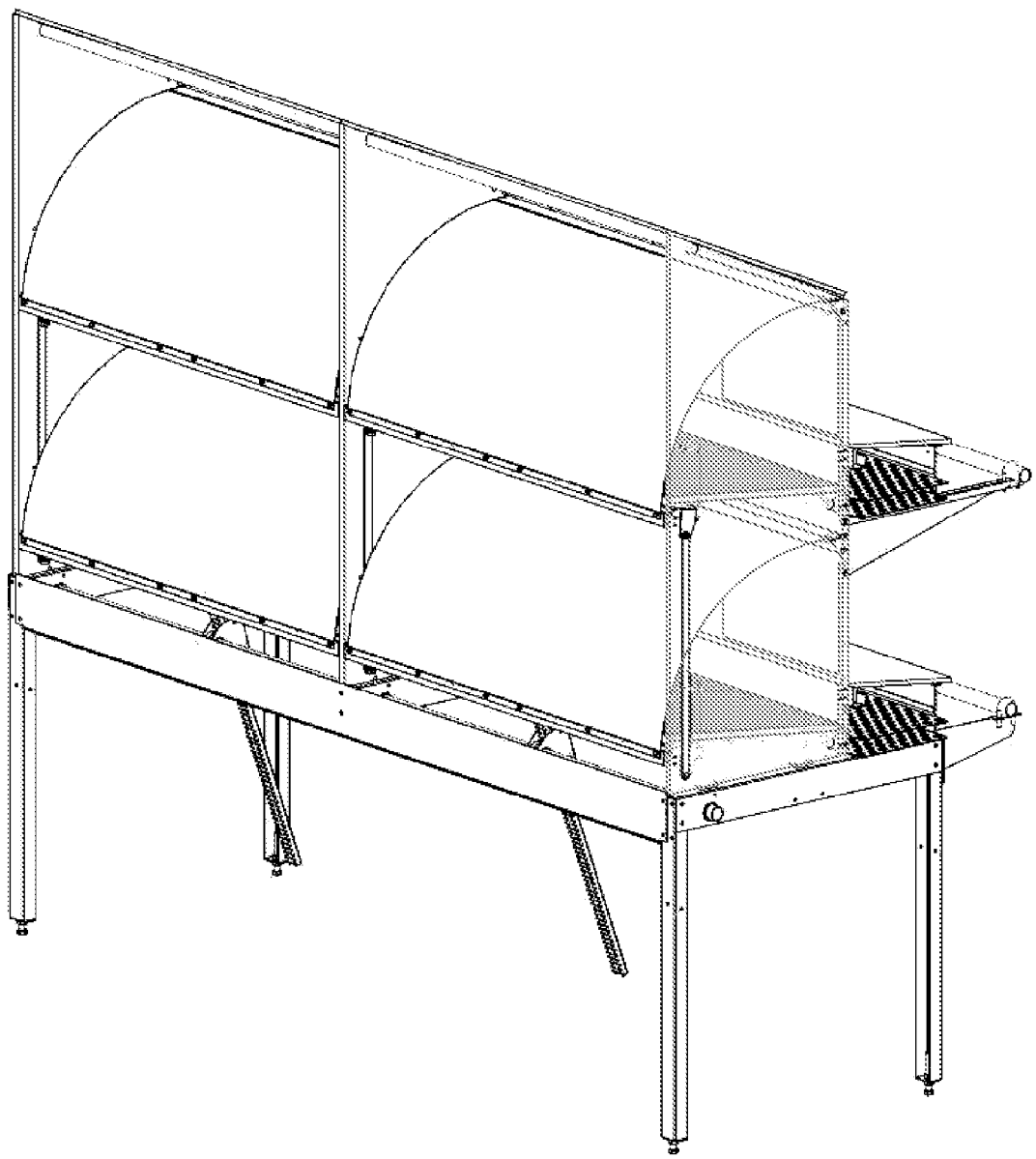
FIG. 1 shows in perspective view a laying nest according to the prior art with a gear rack expulsion system.
Figure 2:
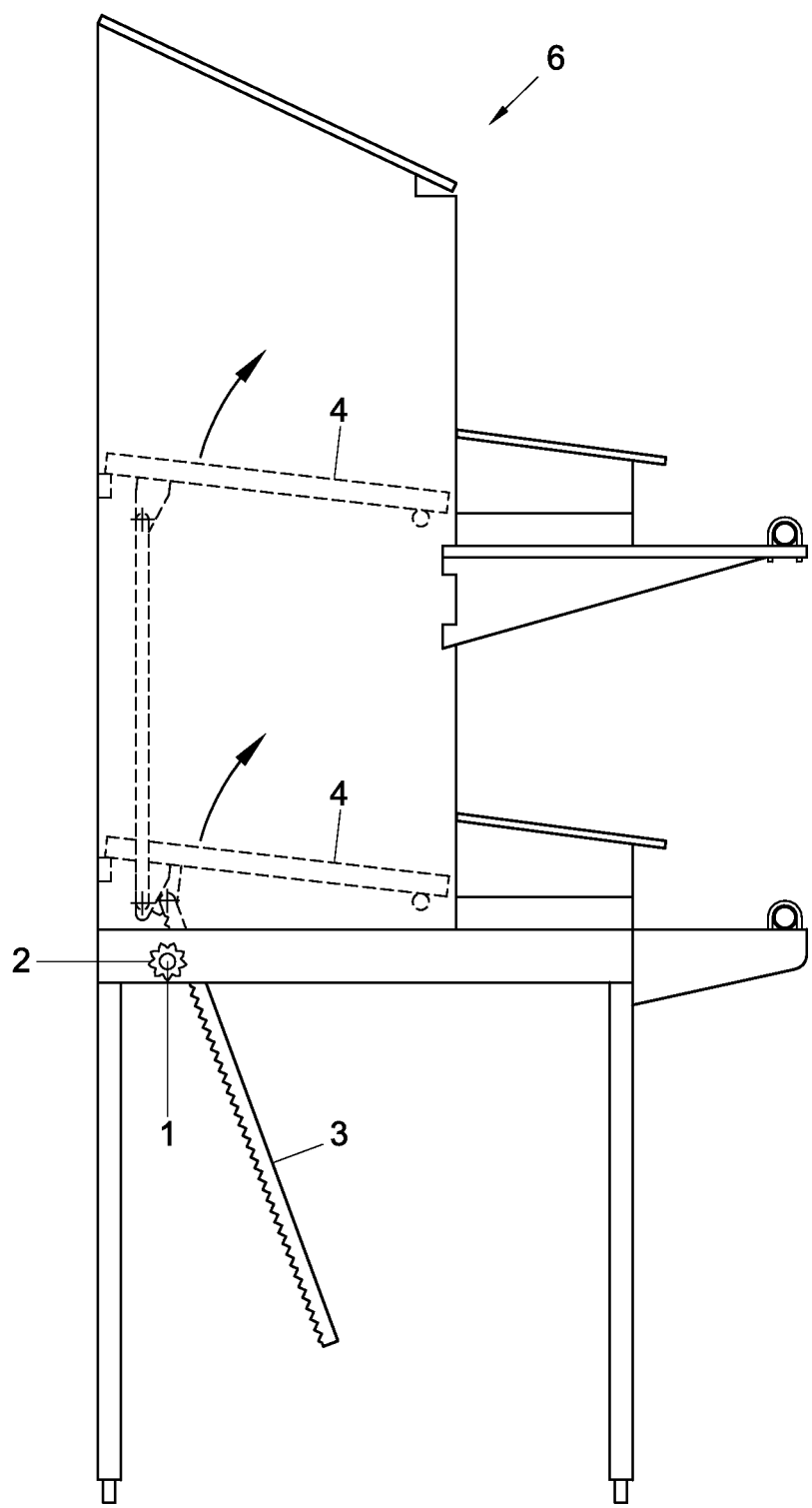
FIG. 2 shows the laying nest from FIG. 1 in side elevational view.
Figure 3:
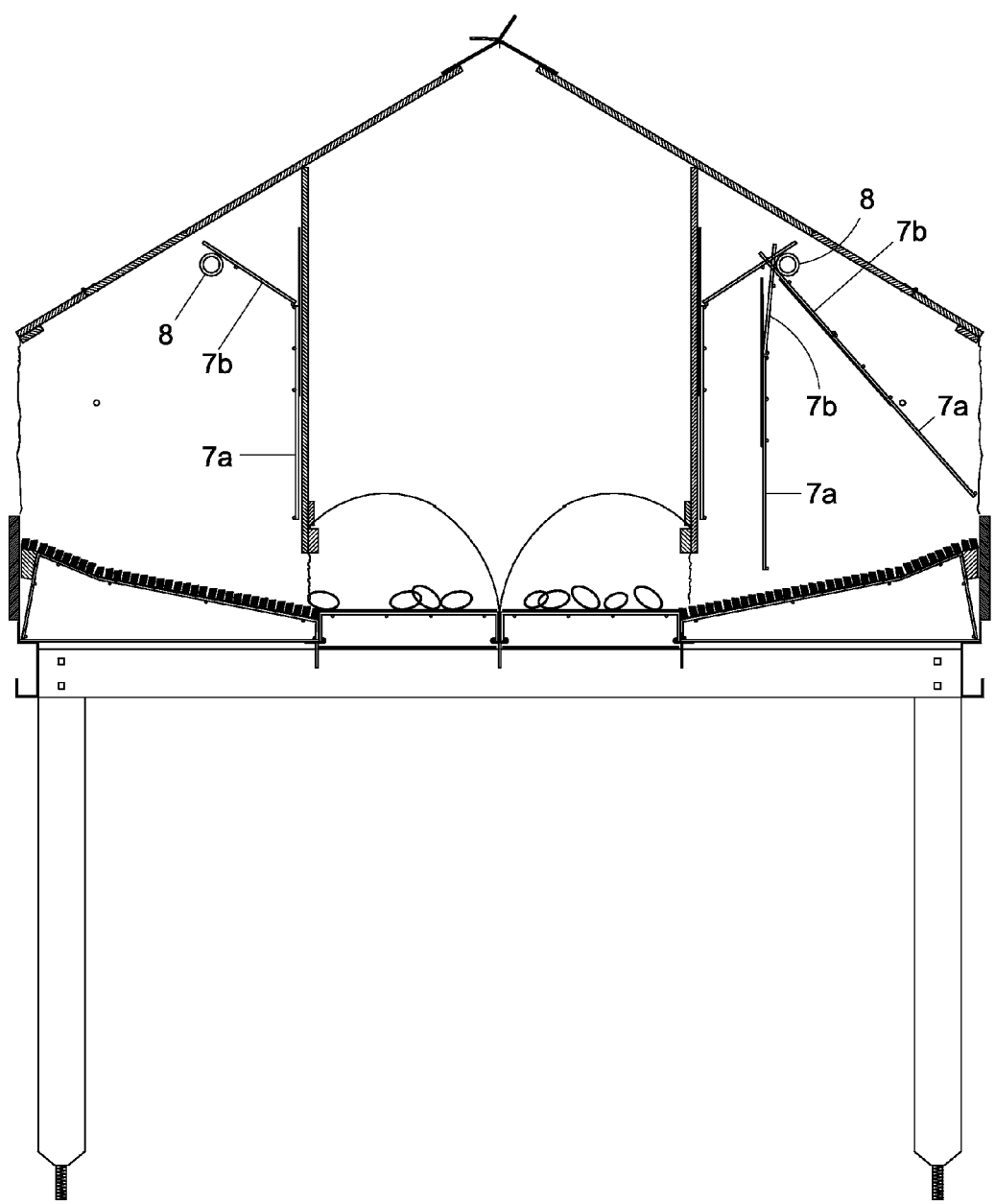
FIG. 3 shows a side elevational view of a laying nest according to the prior art with a torsion expulsion system.

For a description of FIGS. 1-3, reference is made to the description of the background of the invention hereinabove.

Figure 4:
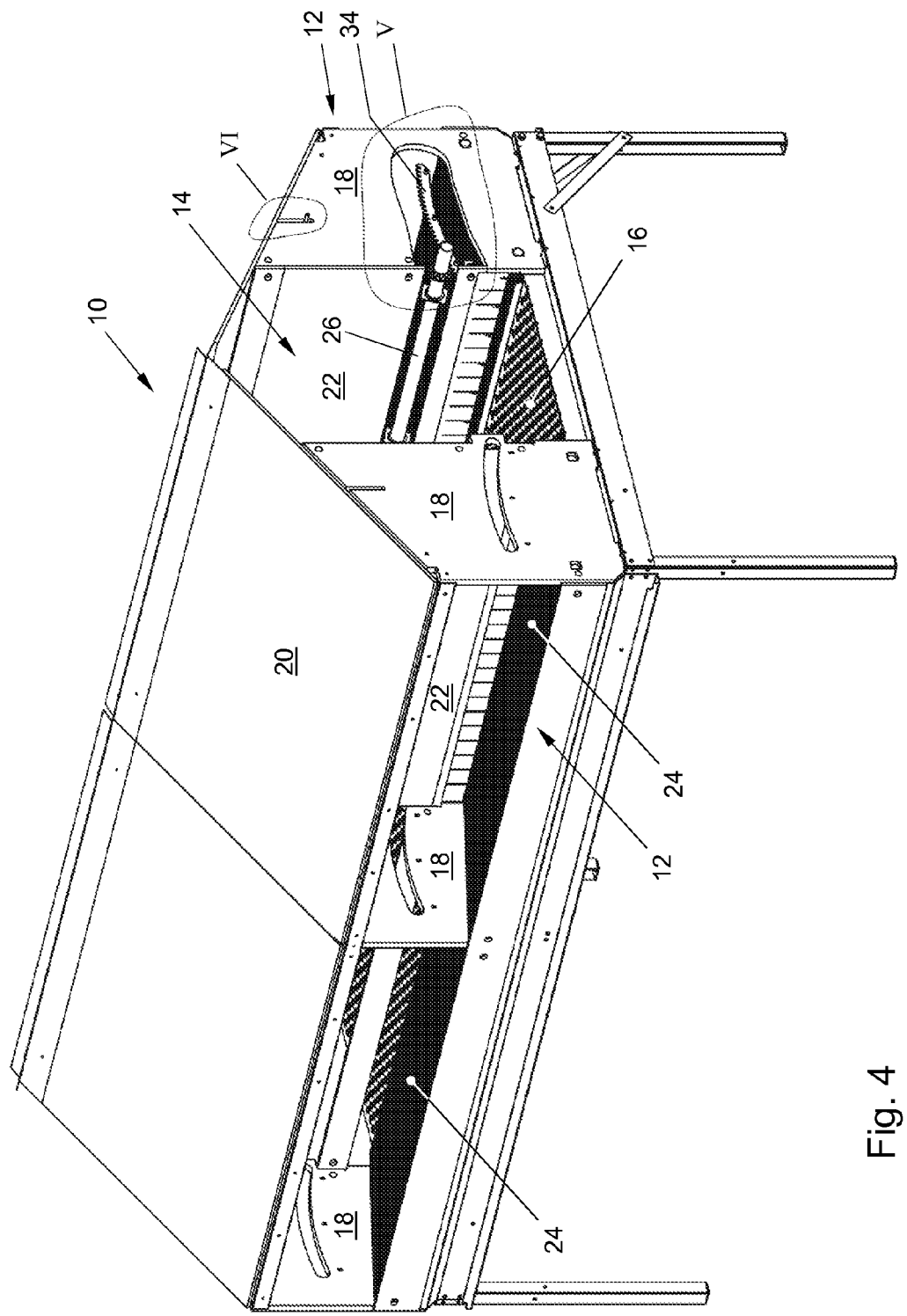
FIG. 4 shows in perspective an example of an expulsion system according to the invention.
Figure 6:
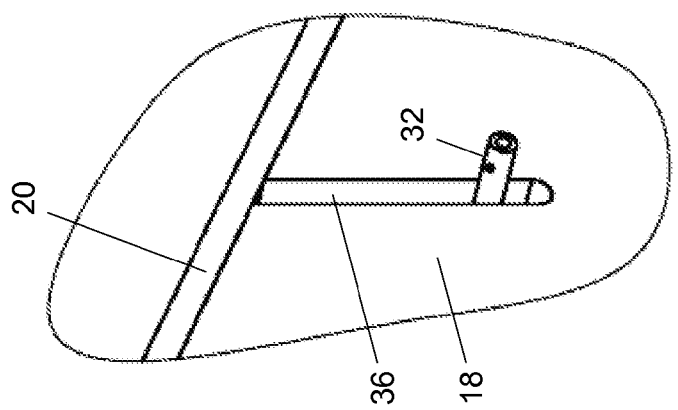
FIG. 6 shows detail VI from FIG. 4.
Figure 5:
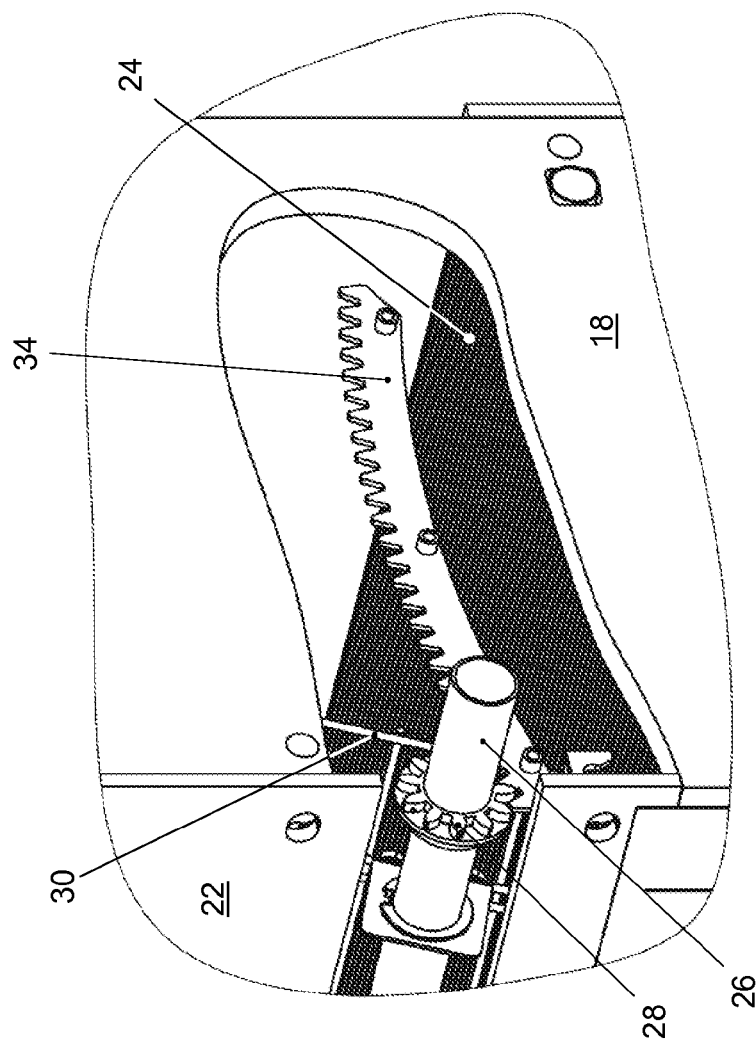
FIG. 5 shows detail V from FIG. 4.

FIG. 4 shows a perspective view of an example of an embodiment of a laying nest according to the invention. The laying nest 10 comprises boxes 12 having at least a bottom 24, sidewalls 18, a back wall 22, and a roof 20. The bottoms 24 of the boxes 12 are disposed so as to slope to some extent, so that eggs upon being laid roll automatically to the lowest point of the bottom 24 and are discharged from the respective box 12 to a collecting space 16. In general, such a collecting space 16 is provided with a conveyor belt or chain conveyor with the aid of which the eggs can be conveyed to an end of the laying nest for further processing. The collecting space 16 is not accessible to the hens. In FIG. 4 a sidewall of the collecting space is omitted in order to make somewhat more detail of the laying nest visible. In the example shown, there are two series of boxes 12 each adjoining a single collecting space 16. However, the invention also relates to a laying nest having a single series of boxes 12. Further, the invention also relates to a laying nest having several tiers of boxes 12. The laying nest 10 is provided with an expulsion system for driving the hens out of the boxes. This is desirable, for instance at night, to prevent soiling of the boxes 12.

The expulsion system from the example is shown in more detail in FIGS. 5-10 and comprises at least one shaft 26 which is provided with at least one gear wheel 28 which is fixedly connected with the shaft 26. Further, the expulsion system comprises at least one expulsion plate 30 which is rotatably connected with the shaft 26. The expulsion plate 30 is further pivotably and slidably connected via a support shaft 32 with the box 12. To that end, in the exemplary embodiment shown, the sidewalls 18 are provided with a vertical slot 36 in which the support shaft 32 is received. It is also possible, however, that such a slot is included in a frame part of the laying nest instead of in a sidewall. The expulsion system further comprises at least one gear rack 34 which is fixedly disposed in the box 12 and which is configured for cooperation with the above-mentioned gear wheel 28, such that upon rotation of the shaft 26, this shaft 26 moves along the gear rack 34, thereby carrying along the expulsion plate 30. In the example shown, the gear racks 34 are each connected with an associated sidewall 18. It is also possible, however, that the gear racks 34 are connected with a frame part of the laying nest 10.

Figure 7:
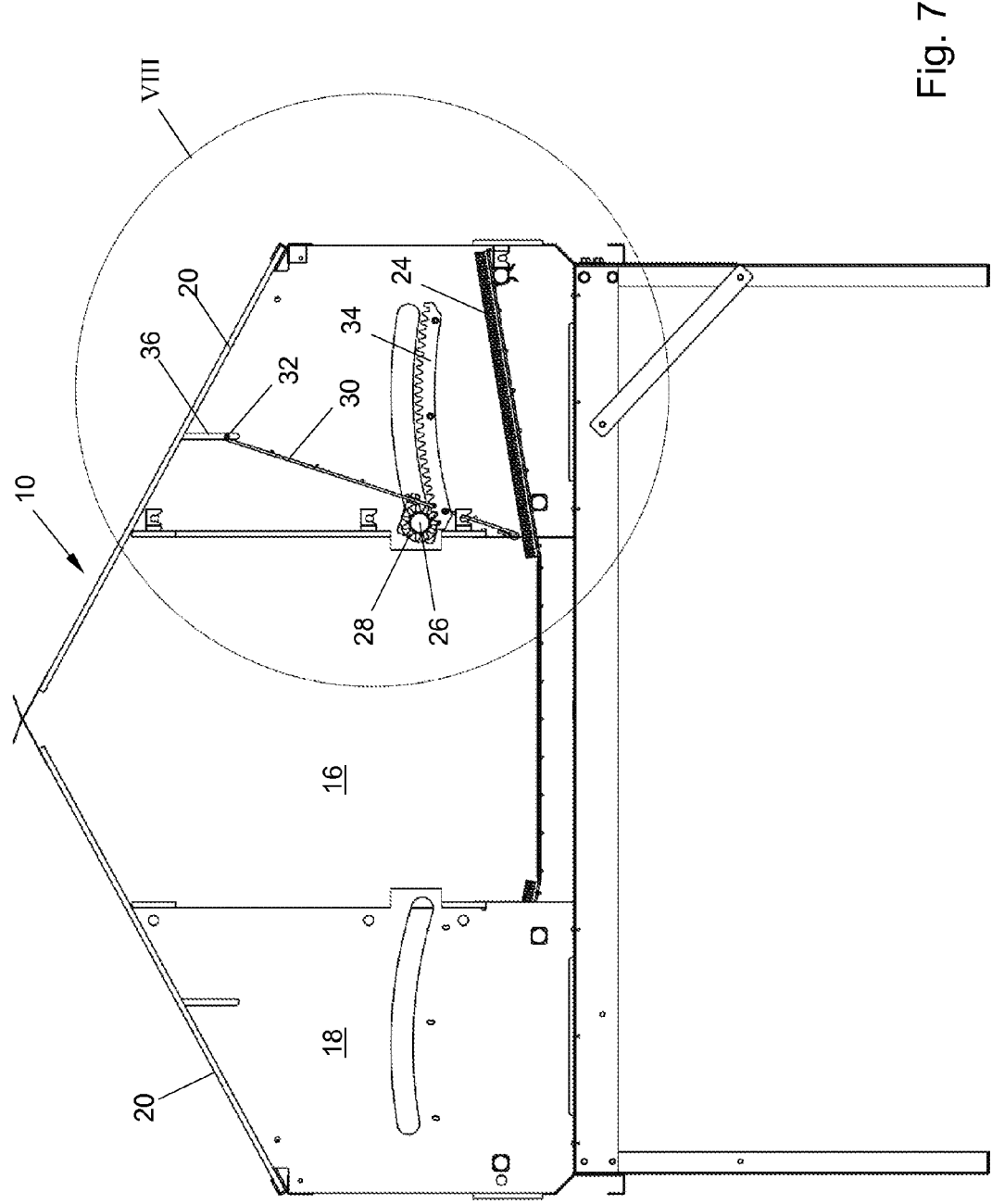
FIG. 7 shows a side elevational view of the example from FIG. 4, with a sidewall of the right-hand box removed for clarity.

FIG. 7 shows a side elevation of the example of the laying nest 10 represented in FIG. 4, with omission of the sidewall of the right-hand series of boxes 12. Clearly visible is the expulsion plate 30, which is in a first end position. In this first end position the hens can enter the bottom 24 of the boxes 12.

Figure 8:
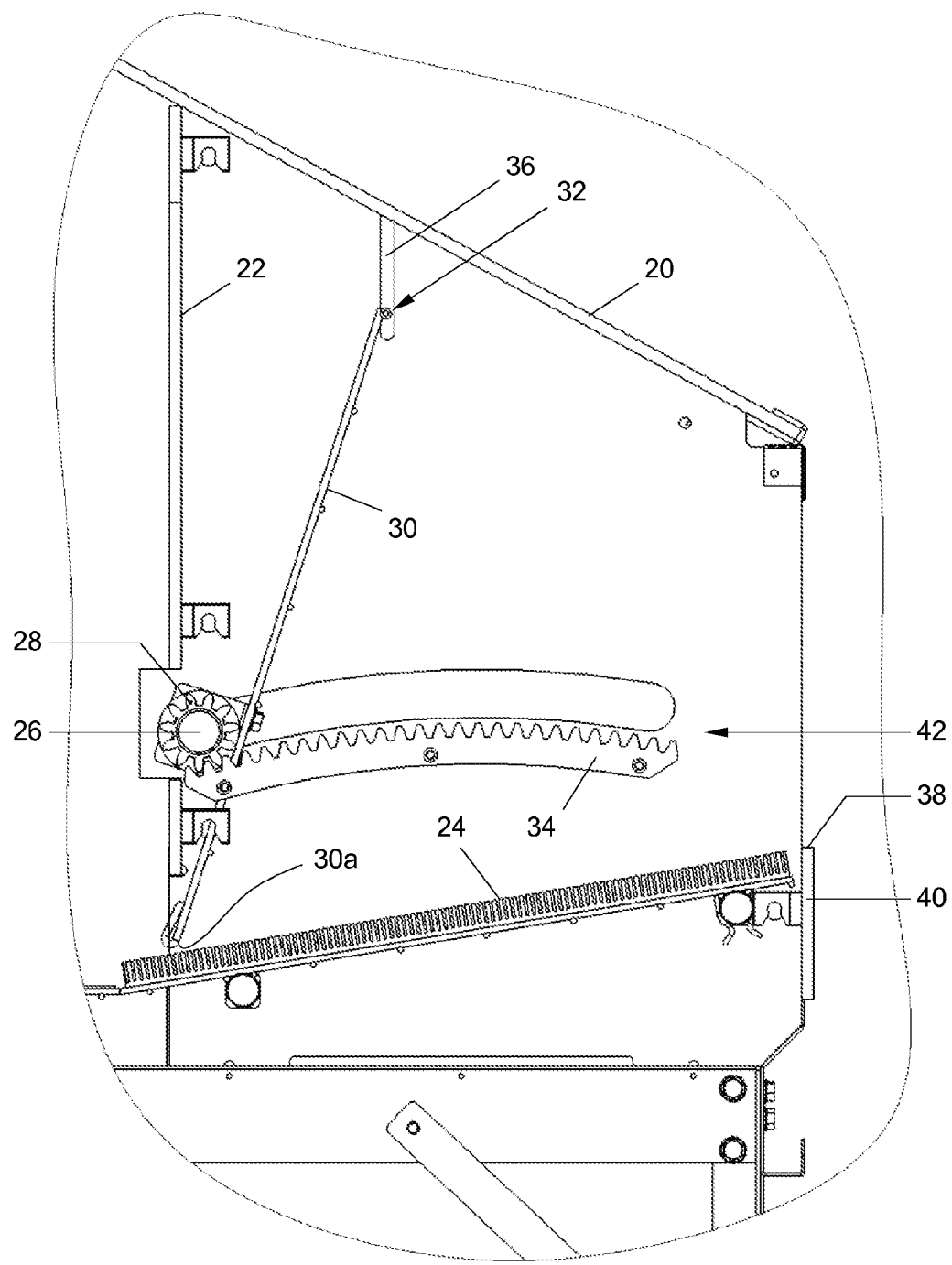
FIG. 8 shows detail VIII from FIG. 7 with the expulsion plate in a first end position.

FIG. 8 shows detail VIII from FIG. 7, with the expulsion plate 30 in the first end position.

Figure 9:
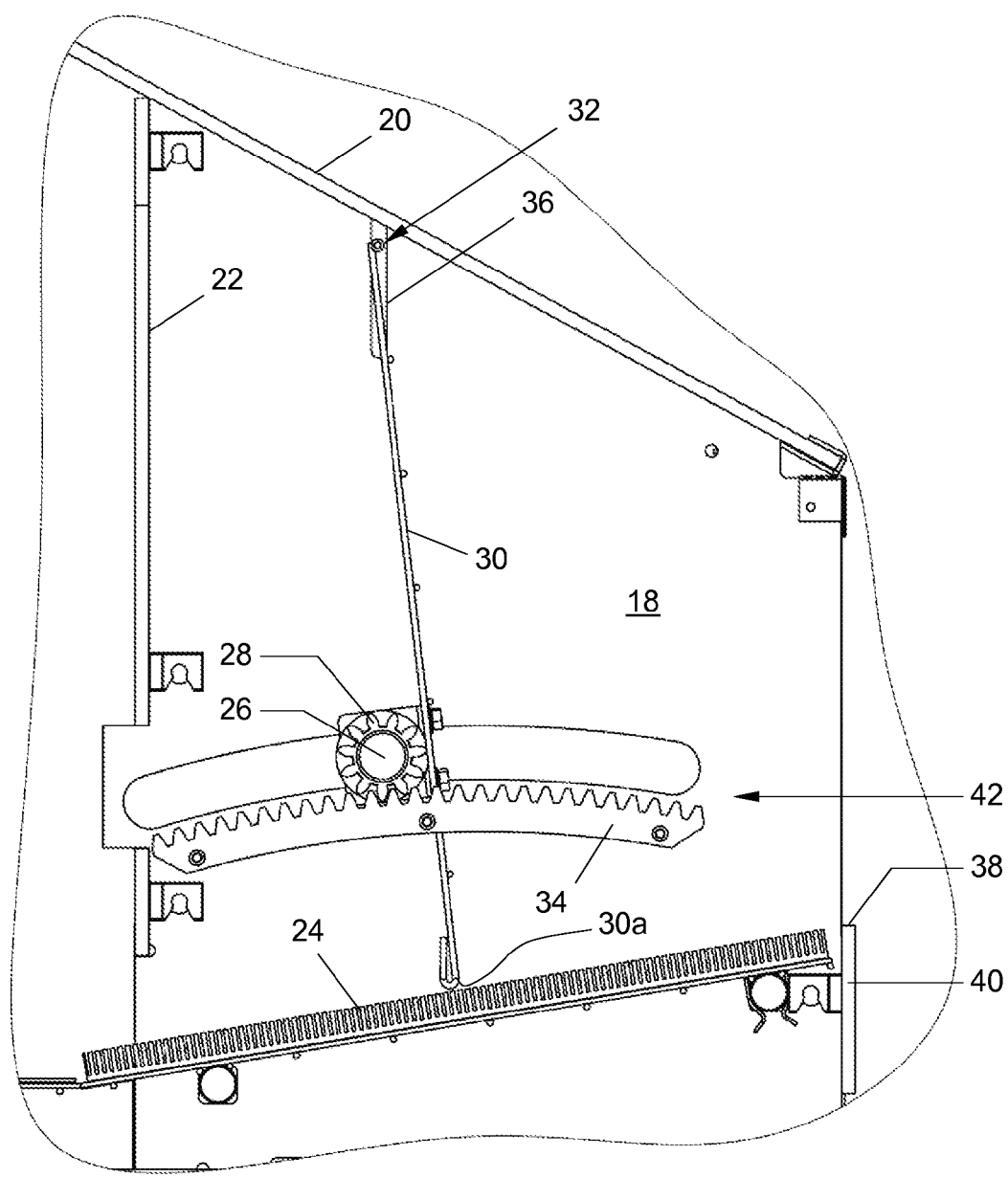
FIG. 9 shows a similar view to detail VIII from FIG. 7, showing the expulsion plate in an intermediate position.

FIG. 9 shows a similar detail to detail VIII, but now with the expulsion plate 30 in a kind of intermediate position. It is clearly visible that the shaft 26 has moved along the gear rack 34 to the right. Also, it is clearly visible that the support shaft 32 has moved up in the slot 36. Further, it is clear that a lower edge 30a of the expulsion plate is situated closely above the bottom 24. The hens cannot slip through between the lower edge 30a and the bottom 24. Also, dead hens will be shoved off the bottom 24 by the expulsion plate 30.

Figure 10:
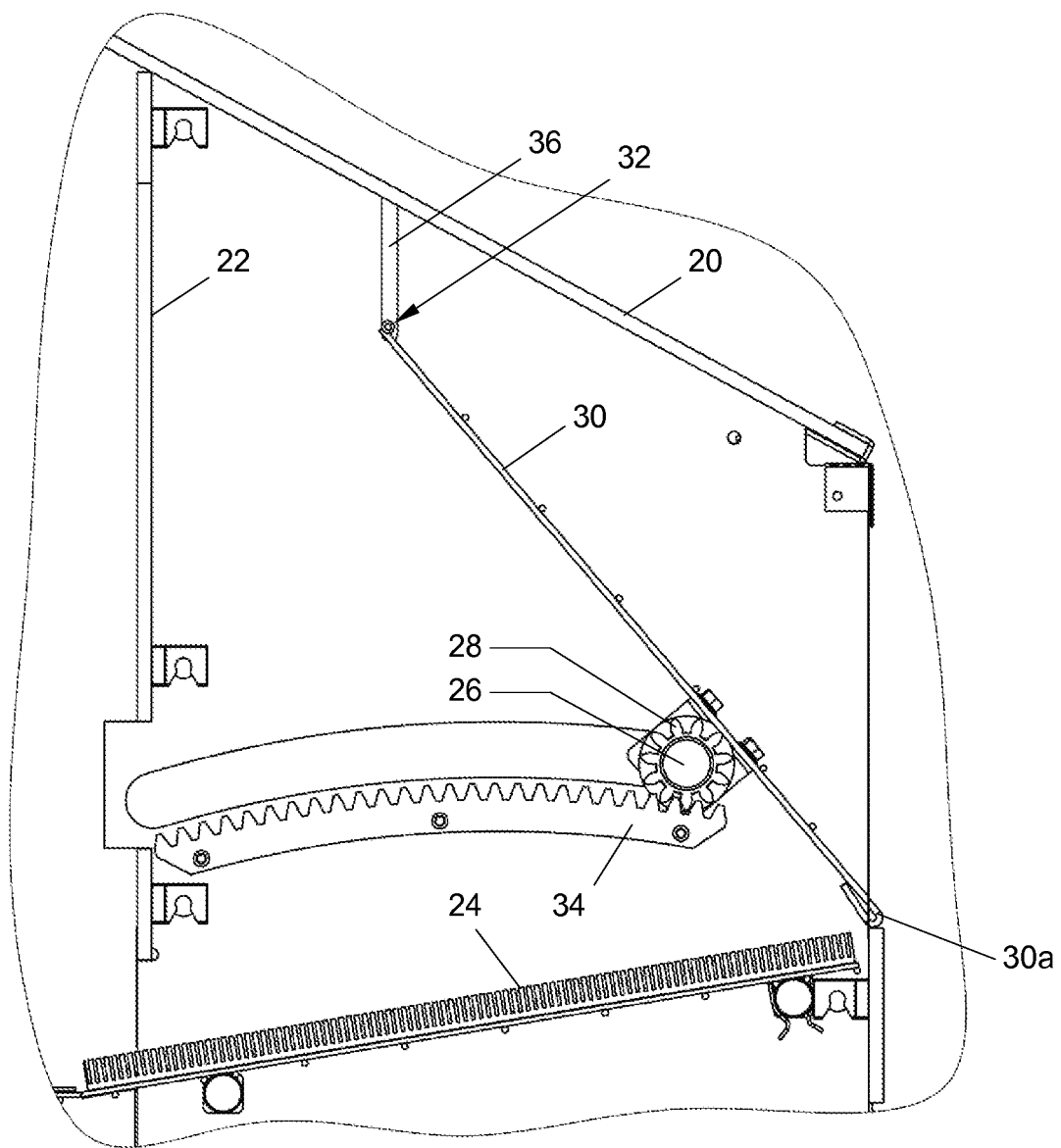
FIG. 10 shows a similar view to detail VIII from FIG. 7, showing the expulsion plate in a second end position.

FIG. 10 shows that the expulsion plate 30 is in a second end position. The lower edge 30a of the expulsion plate now adjoins an upper edge 38 of a front wall 40 of the box 12, which bounds an entrance opening 42 for the hens to the box 12. The hens now cannot reach the bottom 24 anymore and have been driven out of the box 12. It is clearly visible that in the second end position the shaft 26 with the gear wheel 28 has moved all the way to the right. The support shaft 32 now sits at the bottom of the slot 36 again.

In the exemplary embodiment shown, the bottom 24 is implemented as a kind of brush bottom. This is a type of surface on which the hens like to stand. The expulsion plate 30 may be designed as a wire mesh mat. A wire mesh mat consists of metal bars which are mutually connected. Thus, the bars may, for instance, extend perpendicularly to each other and be interconnected by welding. The mutual distance between the parallel bars can be in the range of, for instance, 5-10 cm, so that the openings between the bars cannot be passed by the hens. Instead of being implemented as a wire mesh mat, the expulsion plate may also be formed by a plank of plastic or wood. The expulsion plate 30 need not necessarily be of planar design. It is also possible that the expulsion plate 30 is of curved design or does not have a uniform thickness throughout.

While the invention has been represented in detail and described with reference to the drawing, this drawing and this description should be regarded as an example only. The invention is not limited to the embodiments described. Features that are described in preceding claims may be combined with each other. The reference numerals in the claims should not be construed as limitations of the claims but are for clarification only. Different variants are possible.

The invention claimed is:

1. A laying nest for hens comprising:
    at least one box having at least a bottom, sidewalls, a back wall, and a roof, wherein the at least one box is configured to house hens and eggs;
    an expulsion system that is configured to remove the hens from the at least one box, wherein the expulsion system comprises
    at least a first shaft provided with at least one gear wheel having teeth which is fixedly connected with the first shaft;
    at least one expulsion plate which is rotatably connected with the first shaft and which via a second shaft is pivotably and slidably connected with the box;
    at least one gear rack having teeth that correspond to the teeth of the gear wheel, wherein the gear rack is fixedly arranged in the box and which is configured for cooperation with said gear wheel, wherein upon rotation of the first shaft, the first shaft moves along a path extending parallel to the gear rack, thereby carrying along the expulsion plate thereby moving a lower edge of the expulsion plate closely along the bottom by virtue of the first shaft moving along the path extending parallel to the gear rack and the second shaft sliding vertically along a linear path relative to the box.

2. The laying nest according to claim 1, wherein the gear rack extends along a curved path.

3. The laying nest according to claim 2, wherein the expulsion plate is implemented as a wire mesh mat.

4. The laying nest according to any one of the preceding claims, wherein the second shaft is slidably and rotatably received in a slot which is provided in a sidewall associated with the second shaft.

5. The laying nest according to claim 1, wherein the expulsion plate is implemented as a wire mesh mat.

* * * * *